(12) United States Patent
Lukac

(10) Patent No.: US 9,998,677 B2
(45) Date of Patent: Jun. 12, 2018

(54) METHOD OF ADJUSTING DIGITAL CAMERA IMAGE PROCESSING PARAMETERS

(71) Applicant: Foveon, Inc., San Jose, CA (US)

(72) Inventor: Rastislav Lukac, San Jose, CA (US)

(73) Assignee: Foveon, Inc., San Jose, CA (US)

( * ) Notice: Subject to any disclaimer, the term of this patent is extended or adjusted under 35 U.S.C. 154(b) by 0 days. days.

(21) Appl. No.: 15/097,603

(22) Filed: Apr. 13, 2016

(65) Prior Publication Data

US 2016/0234418 A1 Aug. 11, 2016

Related U.S. Application Data

(62) Division of application No. 13/471,235, filed on May 14, 2012, now Pat. No. 9,813,632.

(60) Provisional application No. 61/487,876, filed on May 19, 2011.

(51) Int. Cl.
*H04N 5/235* (2006.01)
*G06T 1/20* (2006.01)

(52) U.S. Cl.
CPC .............. *H04N 5/2353* (2013.01); *G06T 1/20* (2013.01)

(58) Field of Classification Search
CPC ............... H04N 5/2353; H04N 5/2352; H04N 5/23232; H04N 5/2351; H04N 5/2356; H04N 1/00087; H04N 5/243; H04N 5/35536; H04N 9/045; G03B 7/00; G03B 7/087; G03B 7/093; G06T 2207/20172; G06T 5/001; G06T 5/007
USPC ......... 348/220.1, 221.1, 222.1, 229.1, 224.1, 348/227.1, 345, 349, 356, 362–366, 370
See application file for complete search history.

(56) References Cited

U.S. PATENT DOCUMENTS

| | | | |
|---|---|---|---|
| 5,959,670 A | 9/1999 | Tamura | |
| 6,330,345 B1 | 12/2001 | Russo et al. | |
| 2004/0071461 A1* | 4/2004 | Adam | G03D 13/007 396/311 |
| 2007/0206113 A1 | 9/2007 | Nakamura et al. | |
| 2008/0111913 A1* | 5/2008 | Okamoto | H04N 5/2354 348/363 |
| 2010/0118048 A1 | 5/2010 | Terry et al. | |
| 2010/0208105 A1 | 8/2010 | Kubota | |
| 2010/0277618 A1* | 11/2010 | Hiratsuka | H04N 1/32112 348/239 |

* cited by examiner

*Primary Examiner* — Nhan T Tran
(74) *Attorney, Agent, or Firm* — Glass & Associates; Kenneth D'Alessandro; Kenneth Glass

(57) ABSTRACT

A method for adjusting predetermined ISO-dependent image processing parameters for images captured by a digital camera includes measuring the exposure deviation in exposure units from an optimal exposure as determined by the camera during an image capture process, deriving an estimated camera sensitivity from the exposure deviation, and adjusting the ISO-dependent image processing parameters for images captured by the camera as a function of the derived estimated camera sensitivity.

14 Claims, 4 Drawing Sheets

METHOD OF ADJUSTING DIGITAL CAMERA IMAGE PROCESSING PARAMETERS

RELATED APPLICATIONS

This application is a division of co-pending patent application Ser. No. 13/471,235, filed May 14, 2012, which from the benefit of U.S. Provisional Patent Application No. 61/487,876, filed May 19, 2011, the contents of which are incorporated herein by reference in their entirety.

BACKGROUND

1. Field of the Invention

The present invention relates to processing of digital images. More particularly, the present invention relates to methods for adjusting digital camera image processing parameters in order to achieve improved performance of a digital camera image processing pipeline.

2. The Prior Art

It is quite common that the main camera image processing parameters, particularly, those used to control the noise reduction process, are linked to the ISO sensitivity setting. The quality of images taken at various ISO settings depends greatly on the quality of the algorithm used for noise reduction.

Since noise increases with the increase of ISO sensitivity, as usually demonstrated in terms of the signal-to-noise ratio measurements, it is often necessary to use more aggressive noise reduction at higher ISO sensitivities. However, since aggressive noise reduction smoothes out fine details and blurs the edges in the image, it is also possible to leave more noise in the processed images taken at high ISO settings compared to the processed images taken at low ISO settings.

Unfortunately, the ISO setting is a global parameter which does not address the problem of excessive highlights, deep shadows, and uneven illumination in the scene, and also does not account for overexposure and underexposure effects introduced through the automatic camera capture process or by the user. To avoid this problem, a different solution is needed.

BRIEF DESCRIPTION

According to one aspect of the present invention, capture parameters are employed to adjust predetermined ISO-dependent image processing parameters for images captured by a digital camera.

According to another aspect of the present invention, image statistics are employed to adjust predetermined ISO-dependent image processing parameters for images captured by a digital camera.

According to another aspect of the present invention, both capture parameters and image statistics are employed to adjust predetermined ISO-dependent image processing parameters for images captured by a digital camera.

BRIEF DESCRIPTION OF THE DRAWING FIGURES

DETAILED DESCRIPTION

Figure 1:
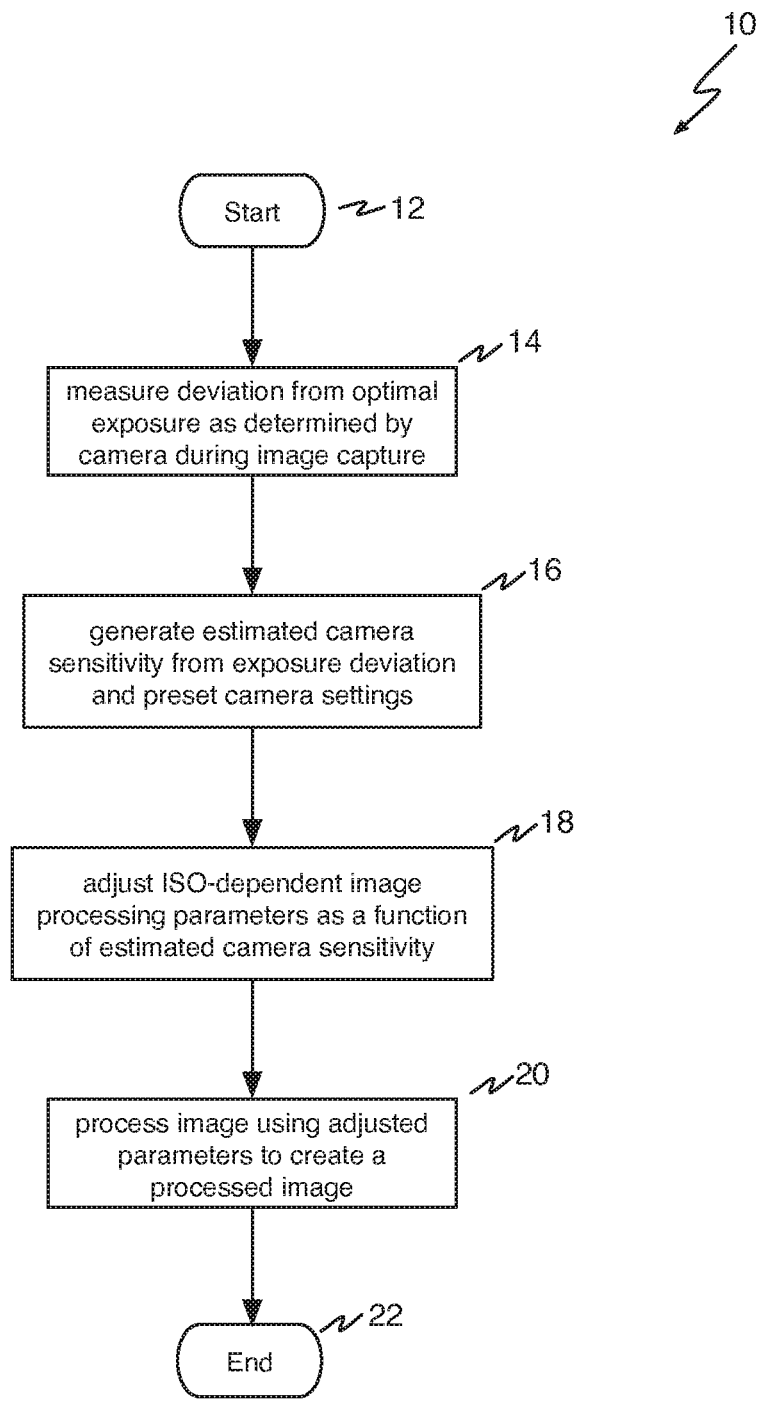
FIG. 1 is a flow diagram showing an illustrative method according to the present invention for employing capture parameters to adjust predetermined ISO-dependent image processing parameters for images captured by a digital camera.

Persons of ordinary skill in the art will realize that the following description of the present invention is illustrative only and not in any way limiting. Other embodiments of the invention will readily suggest themselves to such skilled persons.

The present invention provides methods for adjusting image processing parameters to achieve improved performance of a given digital camera image processing pipeline. This invention is not limited to the specific examples presented below.

According to the present invention methods are disclosed that estimate the ISO setting using the capture parameters and image statistics. This setting, which is an estimation of camera sensitivity, is used to adjust the image processing parameters which are typically determined in calibration according to certain numerical image quality criteria and subjective evaluation of processed images.

Formally, each standard ISO setting in a digital camera, expressed as u∈U, for U={100, 200, 400, 800, 1600, 3200, 6400, 12800, . . . }, can be associated with a set of image processing parameters that are stored as a vector expressed as $\beta(u)=[\beta_1(u), \beta_2(u), \ldots, \beta_N(u)]$, where N denotes the number of ISO-dependent parameters. The parameter u denotes the ISO sensitivity setting in the camera.

Once the estimated camera sensitivity, denoted herein as v, is obtained using the available capture parameters and/or actual image statistics, the final image processing parameters should be set as a function of v, that may be expressed as $\beta(v)=[\beta_1(v), \beta_2(v), \ldots, \beta_N(v)]$, in order to produce the processed image with the best possible quality. Since v can be an arbitrary positive number, final image processing parameters should be obtained as a function of at least one of vectors β predetermined in calibration for all standard ISO settings or their subset.

In one example, the estimated camera sensitivity v is updated by rounding it to the nearest ISO setting in the set U for which the predetermined parameters are available. In another example, the value of v is rounded to the nearest larger or smaller ISO setting in U. In yet another example, the final value of v is calculated as a combination (e.g., average or weighted average) of the two nearest ISO values in U. In yet another example, the final value of v is calculated as a combination of two or more ISO values in U. In such weighted calculations, the weights can be set inversely proportional to the difference between the estimated camera sensitivity and selected ISO values in U, and then normalized in a way so that their summation is equal to unity.

The following presents example solutions for calculating the estimated camera sensitivity value which may be subsequently updated according to the above rounding and combination operations in order to obtain optimal image processing parameters.

The estimated camera sensitivity v can be obtained as a function of the camera ISO setting and the capture parameter indicating the exposure deviation from the optimal exposure. In the following example, the estimated camera sensitivity value v can be obtained as follows:

$$v = u/2^E \quad (1)$$

where u denotes the camera ISO setting, and E denotes the exposure deviation (as determined by the camera during the image capture process) in exposure units from the optimal exposure.

Referring first to FIG. 1, a flow diagram shows an illustrative method 10 according to the present invention for employing capture parameters to adjust predetermined ISO-dependent image processing parameters for images captured by a digital camera. The method begins at reference numeral 12. At reference numeral 14, the deviation from optimal exposure as determined by camera during image capture is measured. At reference numeral 16, the estimated camera sensitivity is generated from the exposure deviation and preset camera settings. At reference numeral 18, the ISO-dependent image processing parameters are adjusted as a function of estimated camera sensitivity. At reference numeral 20, the image is processed using the adjusted parameters to create a processed image. The method then ends at reference numeral 22.

Alternatively, the estimated camera sensitivity can be obtained using the camera capture parameters, as a function of the difference between the camera exposure value and the exposure value calculated using the parameters characterizing ambient illumination.

The so-called reference or camera exposure value is calculated as a function of a camera's shutter speed and an aperture. In the following example, the reference exposure value $EV_{ref}$ is calculated as follows, $$EV_{ref} = \log_2(A^2/t) - \log_2(u/100) \quad (2)$$

where A refers to the aperture, t refers to the shutter speed, and u refers to the camera ISO setting.

The actual exposure value $EV_{act}$, is calculated as a function of the parameters characterizing ambient illumination. Such parameters are usually arranged in an array, with each array value corresponding to a block in a captured image. Each ambient illumination array value can be associated with the weight, resulting in the weighted average-like calculations of the actual exposure value $EV_{act}$, as follows:

$$EV_{act} = T\left(\left(\sum_{i=1}^{N} w_i \alpha_i\right) / \sum_{i=1}^{N} w_i\right) \quad (3)$$

where N denotes the total number of available ambient illumination values, and $w_i$ is the weight associated with the ambient illumination value $\alpha_i$. The function $T(\cdot)$ denotes the relationship between the camera exposure value (or image sensor response) and $\alpha$ values (or ambient illumination sensor response), this function is usually determined in the camera calibration phase. For example, $T(\cdot)$ can be defined as $T(x)=(x-48)/8+5$.

In one example, all the weights can be set to the same value to obtain the average ambient illumination value. In another example, the weights associated with $\alpha_i$ values corresponding to blocks in focus (either indicated by the camera or automatically detected using the captured image data) are set to one, whereas all other weights are set to zero. In yet another example, only the weight associated with the image block of interest (for example, as determined via spot metering or selected by the user in the camera menu or through a PC interface) is set to a nonzero value.

In another example (e.g., corresponding to the center area and center weighted averaging modes) the weight value reduces with the increasing distance from the sensor center. In another example, the weight value reduces with the increasing distance from the image block of interest. In yet another example, the nonzero weight(s) are associated with the samples close to the target ambient value, for instance either predetermined or calculated using an arbitrary function (for example, median, maximum minimum, average of maximum and minimum, etc.) of the acquired ambient illumination values. In yet another example, the weight values or the captured a values can be compared to a predetermined threshold in order to set the weights to zero for those weights or a values which do not satisfied the predetermined thresholding criterion.

Once both the reference exposure value $EV_{ref}$ and the actual reference value $EV_{act}$, are determined, the estimated camera sensitivity can be obtained as a function of these two values. In one example, the estimated camera sensitivity value v is calculated as follows:

$$v = u/2^{(E+(EVref-EVact)sign)} \text{if}(EVref-EVact)sign > \Delta \quad (4)$$

whereas in yet another example $$v = u/2^{(E=(EVref-EVact)sign)} \text{if}(EVref-EVact)sign > \Delta \text{ and } EVact < \eta \quad (5)$$

where $\Delta$ and $\eta$ are predetermined parameters and the sign term denotes a parameter set to 1 or −1 in calibration. In yet another example, the estimated camera sensitivity value can be calculated using either Equation (4) or Equation (5) if the corresponding condition is satisfied, otherwise Equation (1) is used.

Figure 2:
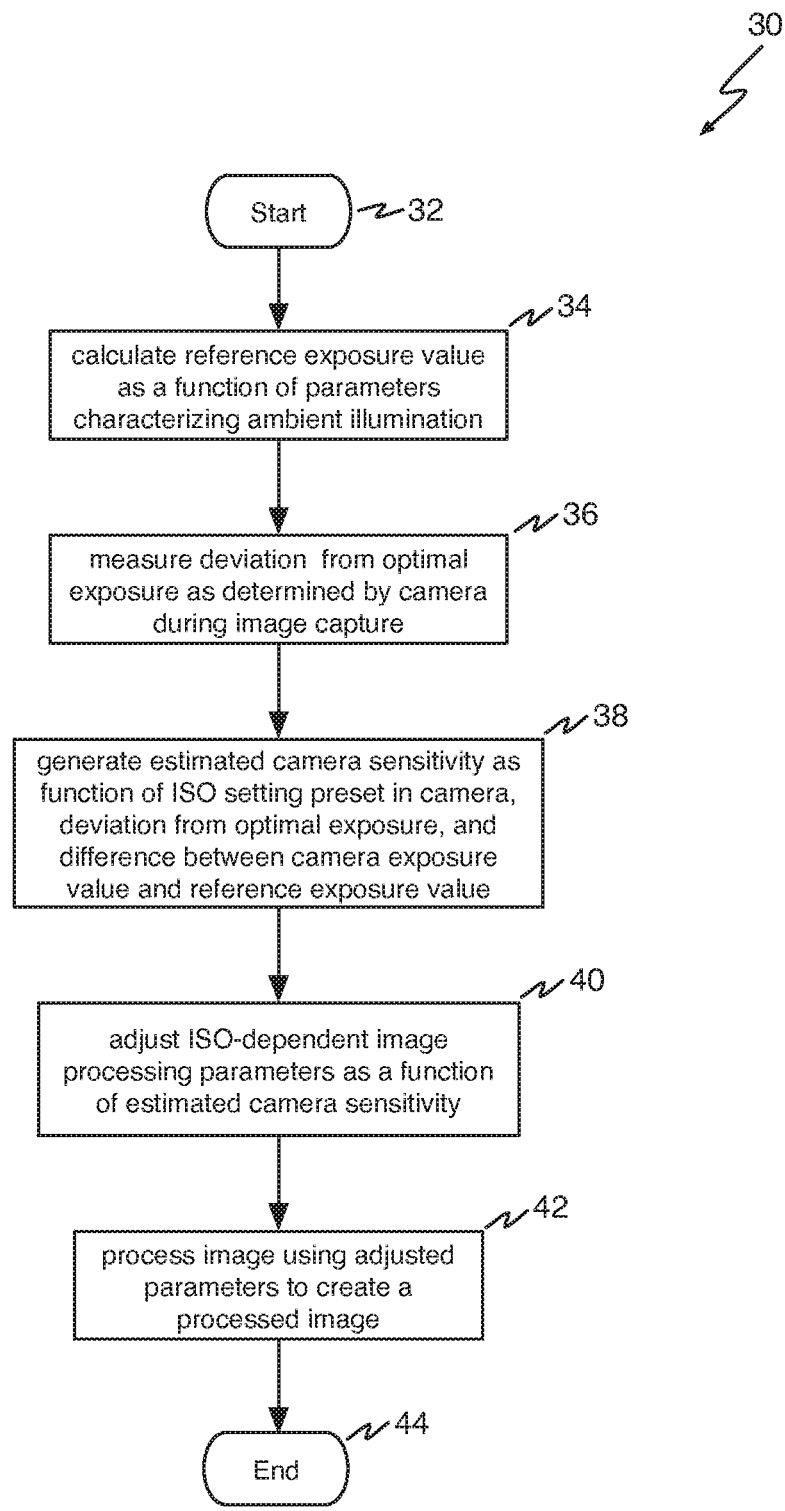
FIG. 2 is a flow diagram showing another illustrative method according to the present invention for employing capture parameters to adjust predetermined ISO-dependent image processing parameters for images captured by a digital camera.

Referring now to FIG. 2, a flow diagram shows an illustrative method 30 according to the present invention for employing capture parameters to adjust predetermined ISO-dependent image processing parameters for images captured by a digital camera. The method begins at reference numeral 32. At reference numeral 34, a reference exposure value is calculated as a function of parameters characterizing ambient illumination. At reference numeral 36, deviation from optimal exposure as determined by the camera during image capture is measured. At reference numeral 38, an estimated camera sensitivity is generated as a function of the ISO setting preset in camera, the deviation from optimal exposure, and the difference between the camera exposure value and the reference exposure value. At reference numeral 40, the ISO-dependent image processing parameters are adjusted as a function of the estimated camera sensitivity. At reference numeral 42, the image is processed using the adjusted parameters to create a processed image. The method then ends at reference numeral 44.

In addition to using the camera capture parameters, the estimated camera sensitivity can be calculated using the actual image statistics. In one example, the estimated camera sensitivity is a function of the average, median, or maximum value L of the image under consideration and the intensity value I predetermined for certain ISO setting u∈U. More specifically, the estimated camera sensitivity value v can be calculated as $$v = u\frac{I}{L} \quad (6)$$

In another example, L denotes the combination of the average, median, and maximum image values. In another example, the estimated camera sensitivity value is a function of the reference histogram obtained in calibration and the actual image histogram. More specifically, using the accumulated histograms the estimated camera sensitivity value v can be calculated as follows:

$$v = \left(\sum_{i=1}^{M} w_i u\frac{I_i}{L_i}\right) / \sum_{i=1}^{M} w_i \quad (7)$$

where $\{I_i\}$ and $\{L_i\}$ denote the intensity levels corresponding to predetermined percentages of samples in the accumulated histograms with M levels. The term $w_i$ denotes the weights associated with the ith histogram measurement. The weights can be predetermined or adaptively determined through statistical analysis, for example, in order to reject outlying measurements by setting the corresponding weights to zero. In one example, determining the weights adaptively includes setting the weights as a function of the difference (e.g., absolute or Euclidean) between the reference histogram obtained in calibration and a histogram of the actual image. Suitable functions include the exponential or sigmoidal function, the weights calculated as inversely proportional to the differences between the two histograms, or the weights obtained by thresholding the histogram differences.

In another example, the actual image statistics, that is L in Equation (6) and $L_i$ in Equation (7) are calculated from one or more image regions of interest. Such region(s) of interest can be determined as regions which are in focus or determined via object detection/pattern recognition (for example, human faces). In yet another example, the image is divided into regular blocks, then the camera sensitivity is estimated in each of these blocks using the concepts behind Equation (6) or Equation (7), and then intermediate results are combined using weighted average with predetermined weights or weights set to follow the strategy in Equation (3) to obtain the estimated camera sensitivity of the actual image.

Figure 3:
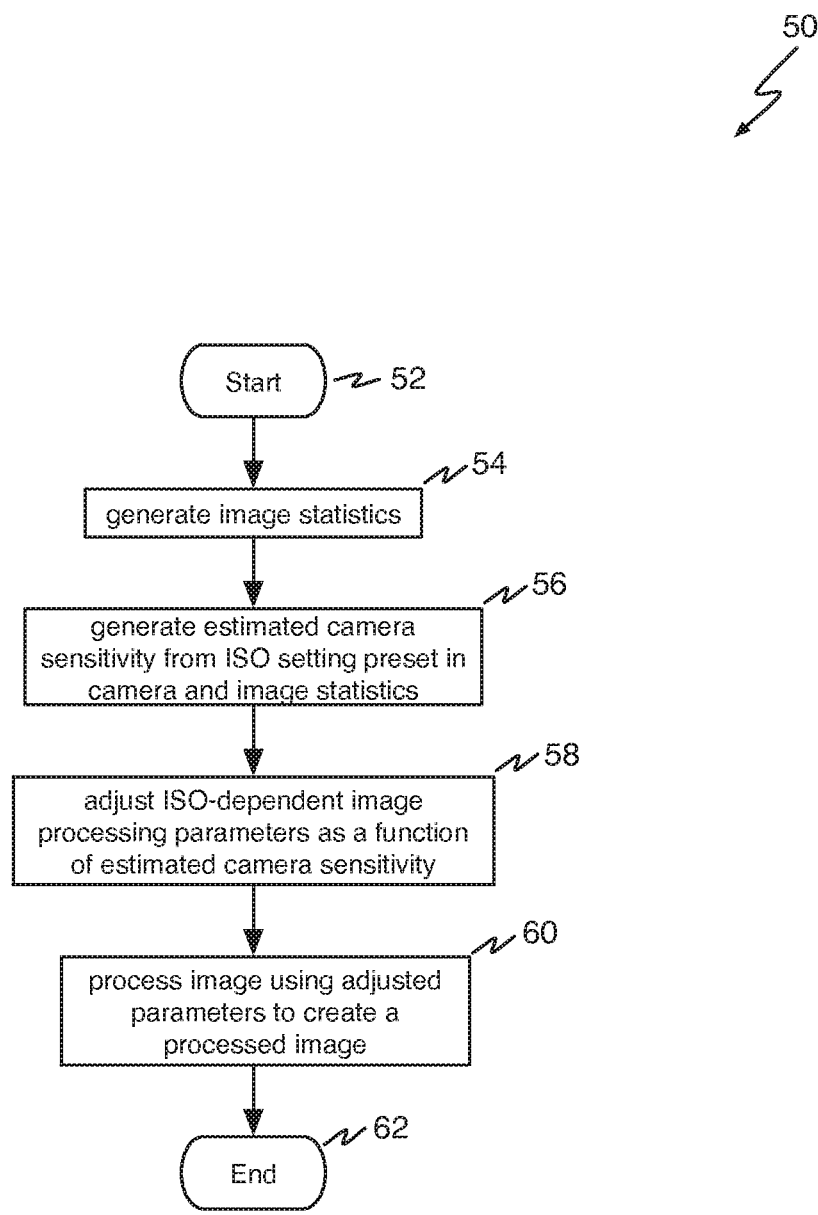
FIG. 3 is a flow diagram showing an illustrative method according to the present invention for employing image statistics to adjust predetermined ISO-dependent image processing parameters for images captured by a digital camera.

Referring now to FIG. 3, a flow diagram shows an illustrative method 50 according to the present invention for employing image statistics to adjust predetermined ISO-dependent image processing parameters for images captured by a digital camera. The method begins at reference numeral 52. At reference numeral 54, image statistics are generated. At reference numeral 56, an estimated camera sensitivity is generated from the ISO setting preset in the camera and the image statistics. At reference numeral 58, the ISO-dependent image processing parameters are adjusted as a function of the estimated camera sensitivity. At reference numeral 60, the image is processed using the adjusted parameters to create a processed image. The method then ends at reference numeral 62.

According to another aspect of the present invention, the two approaches, one based on capture parameters and another based on image statistics, can be combined. In example implementations, the estimated camera sensitivity can be obtained as the minimum, maximum, average, or weighted average of the two intermediate estimated camera sensitivity values obtained using these two approaches.

Figure 4:
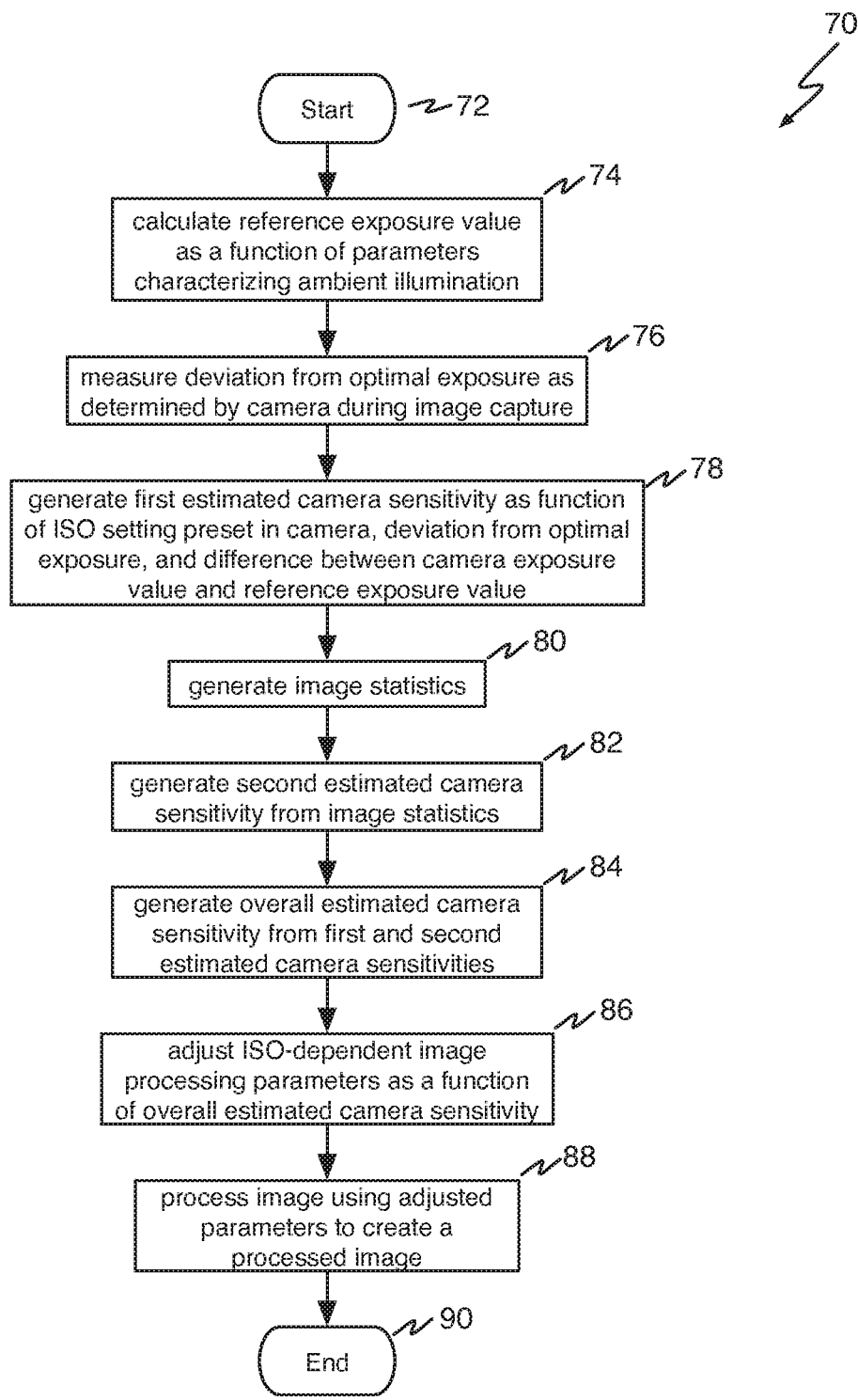
FIG. 4 is a flow diagram showing an illustrative method according to the present invention for employing capture parameters and image statistics to adjust predetermined ISO-dependent image processing parameters for images captured by a digital camera.

Referring now to FIG. 4, a flow diagram shows an illustrative method 70 according to the present invention for employing capture parameters and image statistics to adjust predetermined ISO-dependent image processing parameters for images captured by a digital camera. The method begins at reference numeral 72. At reference numeral 74, a reference exposure value is calculated as a function of parameters characterizing ambient illumination. At reference numeral 76, the deviation from optimal exposure as determined by camera during image capture is measured. At reference numeral 78, a first estimated camera sensitivity is generated as a function of the ISO setting preset in camera, the deviation from optimal exposure, and the difference between the camera exposure value and the reference exposure value. At reference numeral 80, image statistics are generated. The image statistics may include the average, median, or maximum value of the image under consideration. Alternatively, the image statistics can have the form of the image histogram. The image statistics may be calculated from the whole image or from one or more image regions of interest. At reference numeral 82, a second estimated camera sensitivity is generated from image statistics. At reference numeral 84, an overall estimated camera sensitivity is generated from the first and second estimated camera sensitivities. At reference numeral 86, the ISO-dependent image processing parameters are adjusted as a function of overall estimated camera sensitivity. At reference numeral 88, the image is processed using the adjusted parameters to create a processed image. The method ends at reference numeral 90.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. Inventive aspects lie in less than all features of a single foregoing disclosed embodiment, and each embodiment described herein may contain more than one inventive feature.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for adjusting predetermined ISO-dependent image processing parameters for an image captured by a digital camera, comprising:
    measuring the exposure deviation in exposure units from an optimal exposure as determined by the camera during an image capture process;
    generating an estimated camera sensitivity from the exposure deviation of the image captured by the digital camera; and
    adjusting the ISO-dependent image processing parameters for images captured by the camera as a function of the derived estimated camera sensitivity; and processing the captured image using the adjusted parameters to create an adjusted image.

2. The method of claim 1 wherein generating the estimated camera sensitivity includes generating the estimated camera sensitivity from the exposure deviation and the ISO setting preset in the camera.

3. The method of claim 2 wherein generating an estimated camera sensitivity from the exposure deviation comprises rounding the estimated camera sensitivity to the nearest ISO setting for which the predetermined ISO-dependent parameters are available.

4. The method of claim 2 wherein generating an estimated camera sensitivity from the exposure deviation comprises rounding the estimated camera sensitivity to one of the nearest larger and smaller ISO setting values for which the predetermined ISO-dependent parameters are available.

5. The method of claim 2 wherein generating an estimated camera sensitivity from the exposure deviation comprises generating the estimated camera sensitivity as a combination of the two nearest ISO values.

6. The method of claim 5 wherein generating the estimated camera sensitivity as a combination of the two nearest ISO values comprises generating one of an average and a weighted average.

7. The method of claim 6 wherein generating a weighted average comprises:
    setting weights to be inversely proportional to the difference between the estimated camera sensitivity and selected ISO values; and
    normalizing the weights such that their sum is equal to unity.

8. A method for adjusting image processing parameters for an image captured by a digital camera comprising:
    calculating a reference exposure value as a function of parameters characterizing ambient illumination;
    generating an estimated camera sensitivity as a function of the ISO setting preset in the camera and the difference between the camera exposure value and the reference exposure value for the image captured by the digital camera;
    adjusting the ISO-dependent image processing parameters for images captured by the camera as a function of the derived estimated camera sensitivity; and processing the captured image using the adjusted parameters to create an adjusted image.

9. The method of claim 8 wherein generating the estimated camera sensitivity dudes generating the estimated camera sensitivity as a function of the ISO setting preset in the camera and the difference between the camera exposure value and the reference exposure value.

10. The method of claim 8 wherein generating the estimated camera sensitivity includes generating the estimated camera sensitivity from the ISO setting preset in the camera, the exposure deviation measured in exposure units from an optimal exposure as determined by the camera during an image capture process, and the difference between the camera exposure value and the reference exposure value.

11. The method of claim 8 wherein generating an estimated camera sensitivity as a function of the ISO setting preset in the camera and the difference between the camera exposure value and the reference exposure value comprises calculating a camera exposure value as a function of ISO, aperture, and shutter speed settings for the camera.

12. A method for adjusting predetermined ISO-dependent image processing parameters for an image captured by a digital camera, comprising:
    measuring the exposure deviation in exposure units from an optimal exposure as determined by the camera during an image capture process;
    generating an estimated camera sensitivity from the exposure deviation of the image captured by the digital camera and the ISO setting preset in the camera including a combination of the two nearest ISO values; and
    adjusting the ISO-dependent image processing parameters for images captured by the camera as a function of the derived estimated camera sensitivity; and processing the captured image using the adjusted parameters to create an adjusted image.

13. The method of claim 12 wherein generating the estimated camera sensitivity as a combination of the two nearest ISO values comprises generating one of an average and a weighted average.

14. The method of claim 13 wherein generating a weighted average comprises:
    setting weights to be inversely proportional to the difference between the estimated camera sensitivity and selected ISO values; and
    normalizing the weights such that their sum is equal to unity.

* * * * *